United States Patent
Morgan, Jr.

(10) Patent No.: US 7,465,257 B1
(45) Date of Patent: Dec. 16, 2008

(54) CYBER SPORTS EXERCISE SYSTEM

(76) Inventor: Robert Bowman Morgan, Jr., 1895 Patricks Point Dr., Trinidad, CA (US) 95570

( * ) Notice: Subject to any disclaimer, the term of this patent is extended or adjusted under 35 U.S.C. 154(b) by 617 days.

(21) Appl. No.: 11/253,353

(22) Filed: Oct. 18, 2005

Related U.S. Application Data (63) Continuation-in-part of application No. 10/939,642, filed on Sep. 13, 2004, now abandoned.

(51) Int. Cl.
*A63B 69/16* (2006.01)

(52) U.S. Cl. .............................. 482/57; 482/9; 434/257

(58) Field of Classification Search ..................... 482/1, 482/3, 4, 8, 9, 51, 54, 55, 57, 61, 900, 901, 482/902; 472/60, 130; 434/247, 255, 257, 434/258, 433; 463/6, 30, 31; D21/325, 326, D21/329
See application file for complete search history.

(56) References Cited

U.S. PATENT DOCUMENTS

| | | | | |
|---|---|---|---|---|
| 5,713,794 A | * | 2/1998 | Shimojima et al. ............ | 463/36 |
| 5,947,868 A | * | 9/1999 | Dugan ........................... | 482/4 |
| 6,024,675 A | * | 2/2000 | Kashiwaguchi ................ | 482/4 |
| 6,244,988 B1 | * | 6/2001 | Delman ......................... | 482/8 |
| 6,471,586 B1 | * | 10/2002 | Aiki et al. ...................... | 463/6 |
| 6,866,594 B2 | * | 3/2005 | Greenwood ................. | 473/422 |
| 2004/0147369 A1 | * | 7/2004 | Jimenez Laso ................. | 482/8 |

* cited by examiner

*Primary Examiner*—Loan H Thanh
*Assistant Examiner*—Tam Nguyen
(74) *Attorney, Agent, or Firm*—Ocean Law; Paul D. Chancellor (57) ABSTRACT

The present invention provides an exercise system including an exercise device and an interactive game environment. An enclosure receives an exercise device and the exercise device receives a theme element. Sensors, transducers, and a man-machine interface are interconnected by a controller which operates sensory stimulators in response to controller instructions and user, sensor, and transducer signals. Game play is influenced by a user's exercise performance and in an embodiment a first exercise system user competes with a remote second exercise system user utilizing a wide area network that interconnects the controllers of the two exercise systems.

20 Claims, 6 Drawing Sheets

CYBER SPORTS EXERCISE SYSTEM

This application is a continuation-in-part of U.S. utility application Ser. No. 10/939,642 filed Sep. 13, 2004, now abandoned.

BACKGROUND OF THE INVENTION

1. Field of the Invention

The present invention pertains to the mechanical and electrical machines and manufactures. More particularly, the present invention pertains to exercise equipment used in conjunction with a game environment.

2. Description of Related Art

The use of stationary bikes, tread mills, and stepping machines as means for stationary exercise is well known. Recently, such machines have been equipped with timers and sensors as aids to achieve the proper levels and amounts of exercise. These sensors are typically used to measure the user's heart rate and energy expended.

Data collected from these sensors has been used to manage user workouts based on the rate at which a user expends energy, the total energy expended during an exercise period, and heart rate. This exercise management paradigm seeks to assure safe exercise levels where the exercise period and/or total energy expended may be selected by the user.

Exercise equipment of this type is generally available in gyms and health clubs. In addition, medical data shows that regular exercise leads to a healthier life. But, despite the availability of equipment and the promise of a healthier life, many people in the United States and elsewhere fail to get a sufficient quantity of exercise.

There are, however, certain people that appear to thrive on the exercise experience. They seek out opportunities to exercise and make it a priority in their schedules. For these people, the rewards of exercise provide sufficient motivation to overcome its inconveniences.

While those who thrive on the traditional exercise experience do not need further motivation, many others do. For these people, what is needed is to transform the traditional exercise experience into one providing rewards of a nature and degree sufficient to motivate their participation.

SUMMARY OF THE INVENTION

Now in accordance with the invention, there has been found a cyber sports exercise system suitable for motivating some otherwise reluctant people to exercise more frequently.

A partially enclosed space defined by a base having one or more first mechanical mounting fixtures, a forward wall, a partial rear wall, and a partial ceiling. Users are motivated by a controller having a set of controller instructions that embody an interactive game. Selected from a plurality of different exercise devices is a game appropriate exercise device having one or more second mechanical mounting fixtures and one or more third mechanical mounting fixtures. At least one of the second mechanical mounting fixtures releasably engages a respective first mechanical mounting fixture. Selected from a plurality of different theme elements is a game appropriate theme element having one or more fourth mechanical mounting fixtures. At least one of the fourth mechanical mounting fixtures releasably engages a respective third mounting fixture. An attribute module of the exercise device is for informing the controller of the exercise device type and an attribute module of the theme element is for informing the controller of the theme element type. The controller is in signal communication with the attribute modules, and exercise device sensor, a biometric sensor, a theme element transducer and a man-machine interface for creating a game environment within the partially enclosed space that is responsive to a user's operation of the exercise device and the theme element.

BRIEF DESCRIPTION OF THE DRAWINGS

The novel features of this invention will be best understood from the accompanying drawings, taken in conjunction with the accompanying description, in which similar characters refer to similar parts, and in which.

DESCRIPTION OF THE PREFERRED EMBODIMENTS

Figure 1:
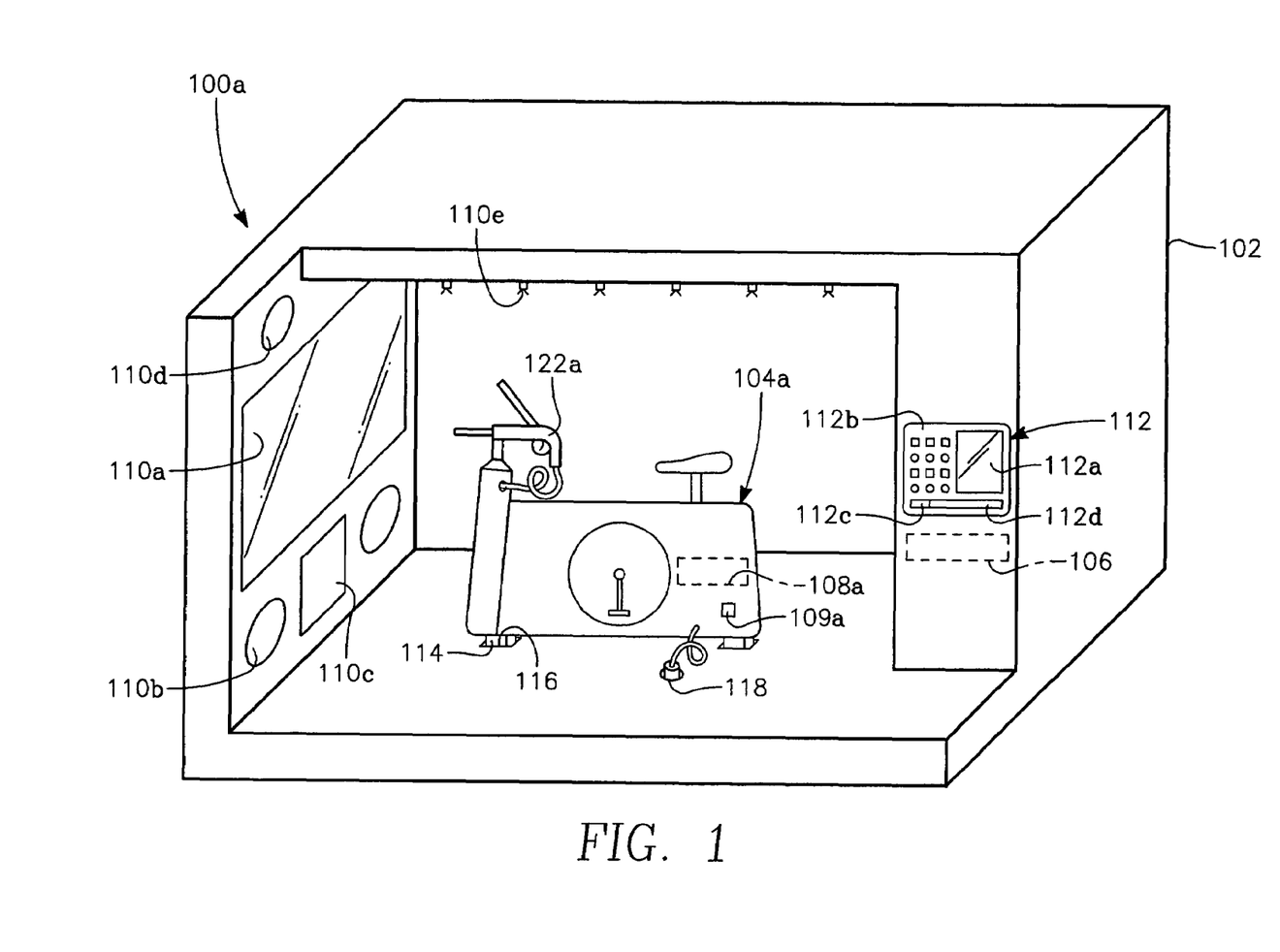
FIG. 1 is a perspective view of a cyber sports exercise system in accordance with the present invention.

FIG. 1 shows a cyber sports exercise system 100a in accordance with the present invention. System elements include an enclosure 102 supporting an exercise device 104a, a theme element 122a, a controller 106, sensory stimulators 110a-e, and a control panel 112.

Figure 2:
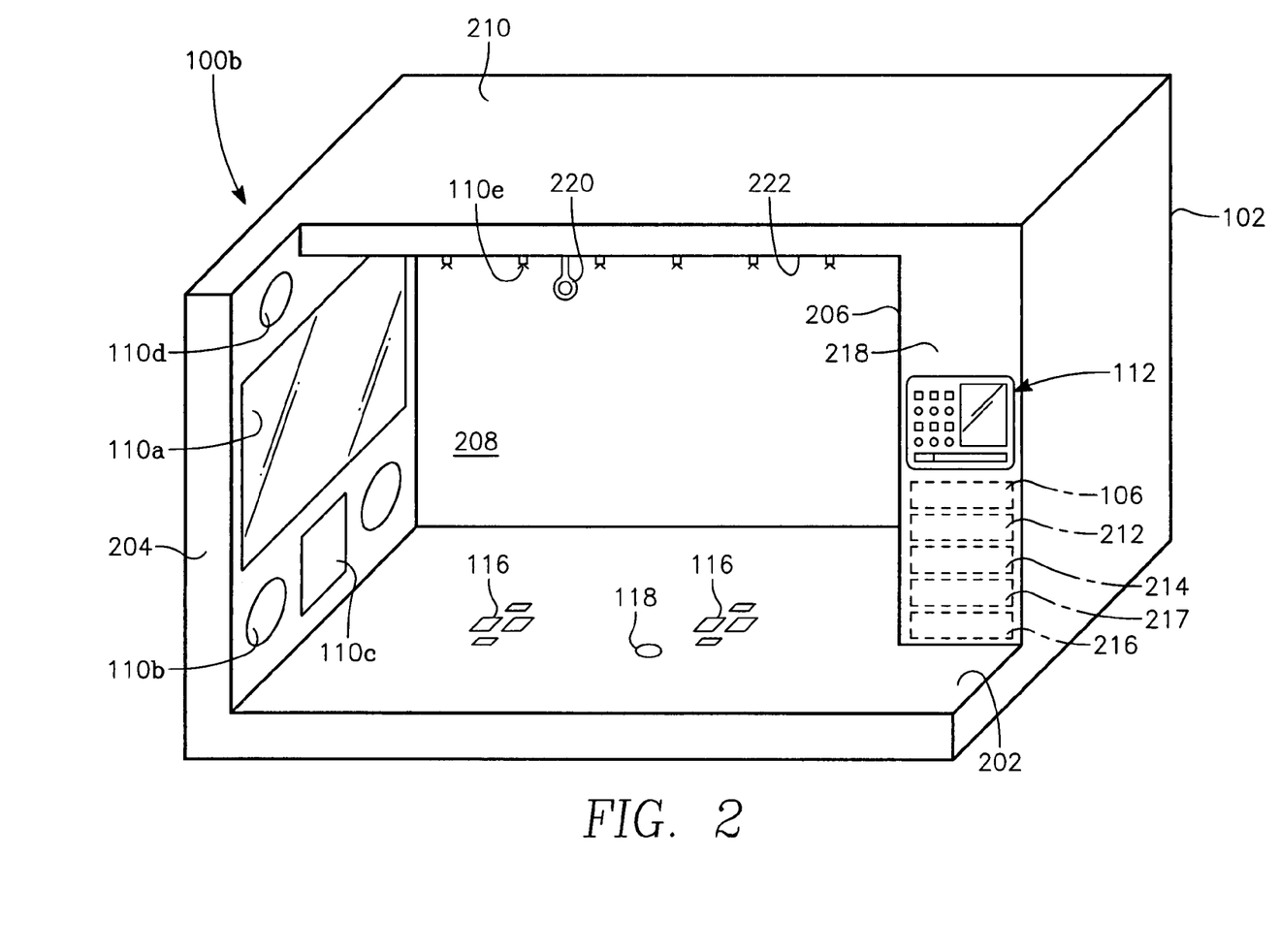
FIG. 2 is a perspective view of the cyber sports exercise system enclosure of FIG. 1.

FIG. 2 shows the cyber sports exercise system 100b with the exercise device removed. A base portion of the enclosure 202 has a forward wall 204, and an opposed partial rear wall 206. In some embodiments, a side wall 208 spans between the forward and rear walls. A partial ceiling 210 is supported by one or more of the walls. Here, the base, walls, and ceiling define a partially enclosed space.

In the base 202, sockets or first mechanical mounting fixtures 116 receive leg(s) or second mechanical mounting fixtures 114a of the exercise device 104a. A base electrical connector 118 is provided for receiving a mating exercise device electrical connector 302a (see FIGS. 3A-E) of the exercise device. The base connector 118 is electrically interconnected with the controller 106. In some embodiments, the base and exercise device electrical connectors are integrated with their respective mechanical attachments 116, 114a.

Attached to the forward wall 204 is a video display 110a, one or more speakers 110b, a fan 110c and a heater 110d. Each of these devices is oriented to provide sensory stimulation including respectively sight, sound, touch, and temperature simulation to a user of the exercise device.

Suitable video displays 110a include LCD screens, plasma screens, projection television screens, video projectors, and other optical projection devices. The video display and speakers 110b are coupled to the controller with an appropriate electrical interface such as respectively a computer video circuit card or a computer audio circuit card. In an embodiment, the speakers are two-way devices capable of emitting sound and capable of acting as microphones to transmit a sound such as the user's voice. The fan 110c and heater 110d are coupled to the controller by an electrical interface such as a computer analog driver card including wet contacts and/or dry contacts. In some embodiments, a digital output of the controller may be used to control these devices.

The partial rear wall 206 houses the controller 106, a compressor 212, a smoke generator 214, an odor generator 217, and a mist generator 216. In addition, the control panel 112 is mounted on an exposed face 218 of the partial rear wall. The compressor and generators are coupled to the controller with appropriate electrical interfaces such as those used for the fan above.

Mounted to the underside 222 of the partial ceiling 210 is an array of sensory stimulator fluid outlet heads 110e. These fluid outlet heads are fluidly interconnected with one or more of the air compressor 212, the smoke generator, 214, the mist generator 216, and the odor generator 217. In addition, an eyelet 220 attached to the underside of the ceiling provides support for exercise devices such as a punching bag (see below). In some embodiments, one or more of the fluid outlet heads is attached to the front wall 204, the partial rear wall 206, or the base 202.

FIGS. 3A-E show exemplary exercise devices 104a-e that are removably attachable to the enclosure 102. Pictured in the exemplary embodiment shown in FIGS. 1 and 3a, the stationary bike 104a has forward and rear legs 114a that are for removably engaging the mounts or sockets in the base of the enclosure 116. Exercise device sensors 108a associated with the stationary bike are used to indicate the work done by a user pedaling the bike by measuring for example the torque applied to and the angular displacement of a shaft actuated by the pedals 304a. An electrical cable 120a interconnects the sensors with an exercise device electrical connector 302a which is for mating with the base connector of the enclosure 118.

Figure 3A:
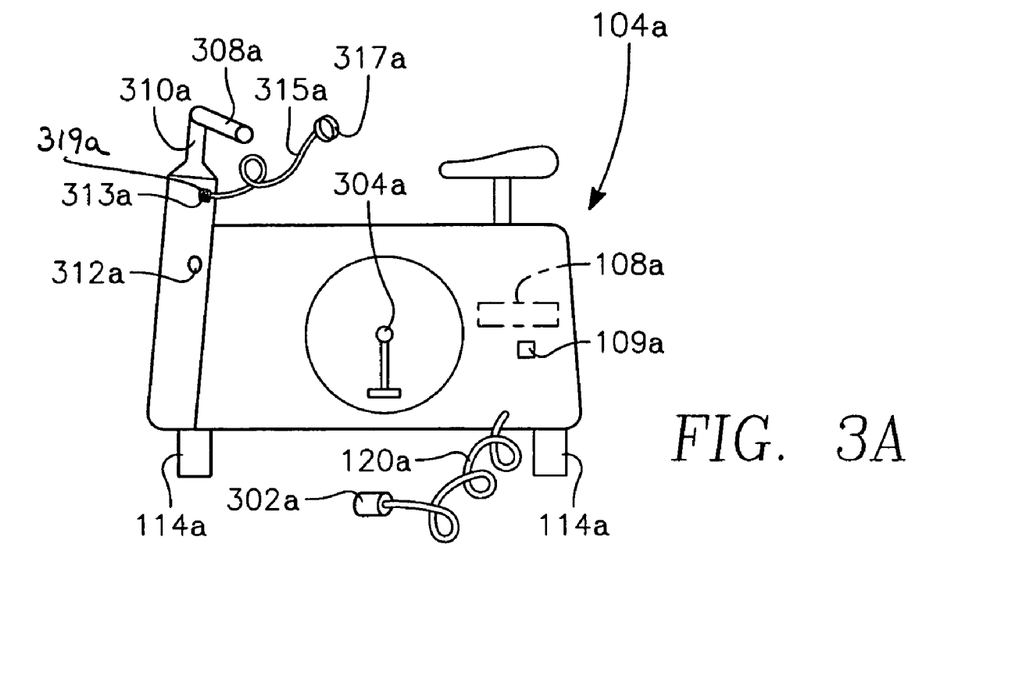
FIG. 3a is a side view of a stationary bike exercise device of the cyber sports exercise system of FIG. 1.
Figure 3B:
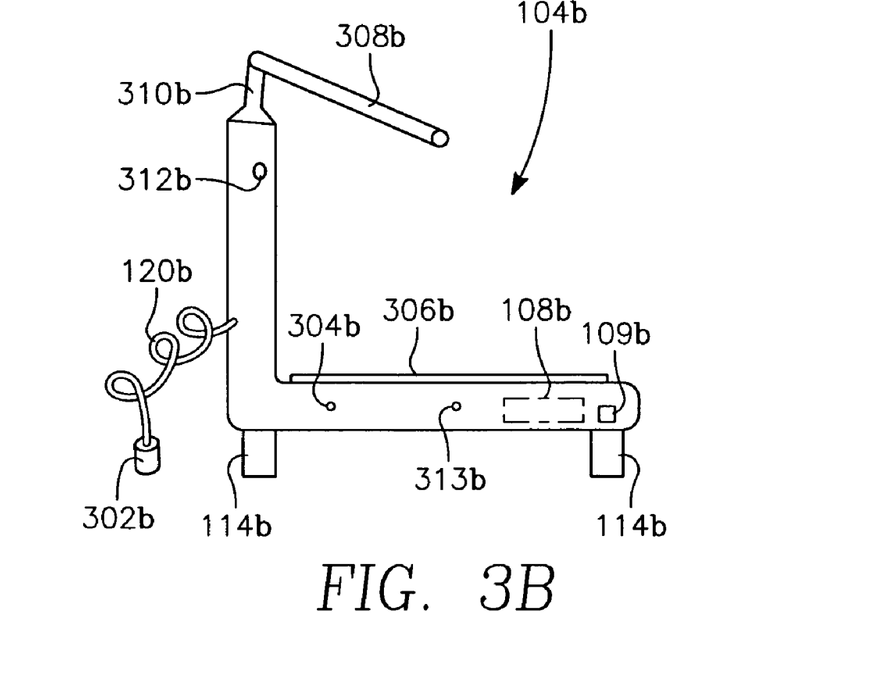
FIG. 3b is a side view of a tread mill exercise device of the cyber sports exercise system of FIG. 1.

FIG. 3b shows a tread mill exercise device 104b. The tread mill has forward and rear legs 114b that are for removably engaging the mounts or sockets in the base of the enclosure 116. Exercise device sensors 108b associated with the tread mill are used to indicate the work done by a user actuating the tread(s) 306b by measuring for example the torque applied to and the rotational speed of a shaft 304b actuated by the tread(s). An electrical cable 120b interconnects the sensors with exercise device electrical connector 302b which is for mating with the base connector of the enclosure 118.

Figure 3C:
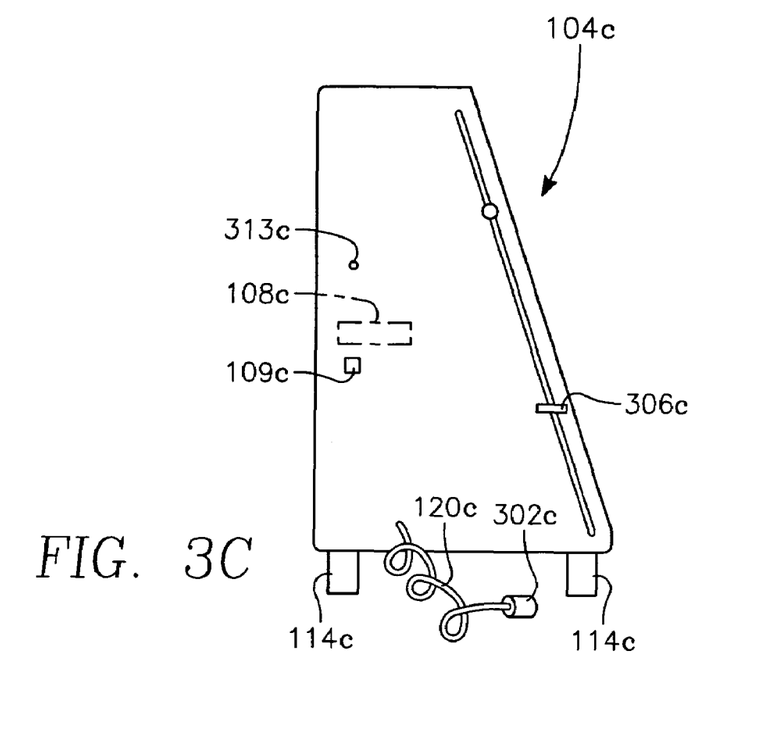
FIG. 3c is a side view of a stepping machine exercise device bike of the cyber sports exercise system of FIG. 1.

FIG. 3c shows a stepping machine exercise device 104c. The stepping machine has forward and rear legs 114c that are for removably engaging the mounts or sockets in the base of the enclosure 116. Exercise device sensors 108c associated with the stepping machine are used to indicate the work done by a user actuating the steps 306c by measuring for example the force applied to and the distance traveled by the steps. An electrical cable 120c interconnects the sensors with electrical connector 302c which is for mating with the base connector of the enclosure 118.

Figure 3D:
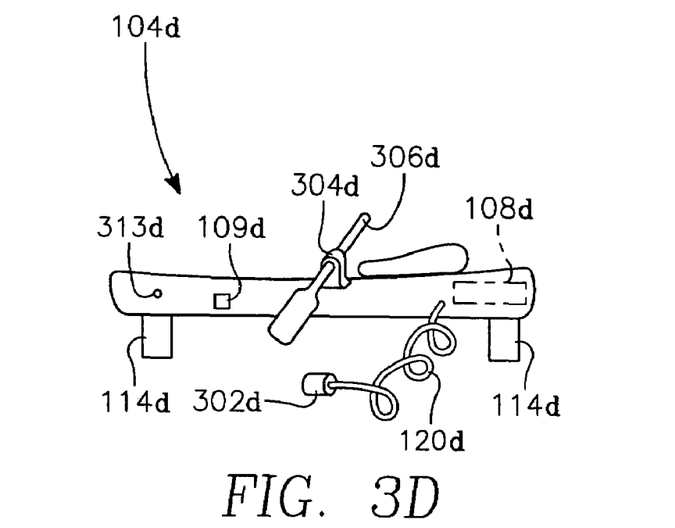
FIG. 3d is a side view of a kayak exercise device of the cyber sports exercise system of FIG. 1.

FIG. 3d shows a kayak machine exercise device 104d. The kayak machine has forward and rear legs 114d that are for removably engaging the mounts or sockets in the base of the enclosure 116. Exercise device sensors 108d associated with the kayak machine are used to indicate the work done by a user in actuating the oars 306d by measuring for example the torque applied to and the angular displacement of a rotatable mount of the oars 304d. An electrical cable 120d interconnects the sensors with an exercise device electrical connector 302d which is for mating with the base connector of the enclosure 118.

Figures 3E, 4A, 4B:
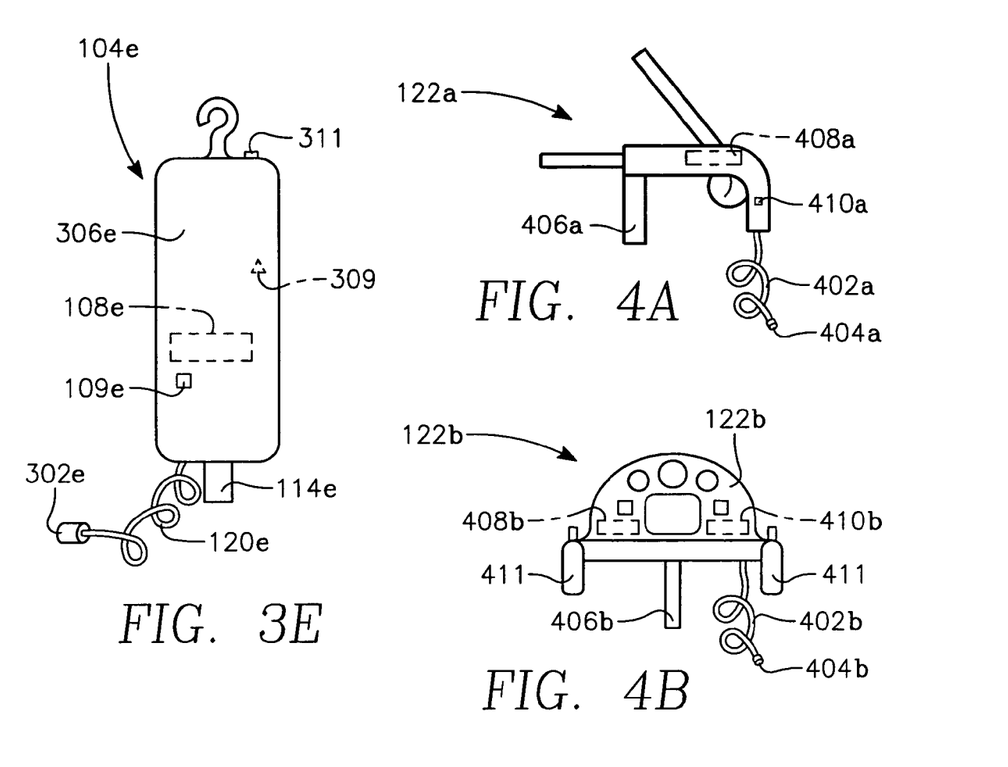
FIG. 3e is a side view of a punching bag exercise device of the cyber sports exercise system of FIG. 1.
FIG. 4b is a front view of an aircraft control panel theme element of the cyber sports exercise system of FIG. 1.
FIG. 4a is a side view of a rifle theme element of the cyber sports exercise system of FIG. 1.

FIG. 3e shows a punching bag exercise device 104e. The punching bag has a lower leg 114e that is for removably engaging the mounts or sockets in the base of the enclosure 116. Exercise device sensors 108e associated with the punching bag are used to indicate the work done by a user in punching the bag 306e by measuring for example acceleration, velocity, and/or altitude of the punching bag. An electrical cable 120e interconnects the sensors with an exercise device electrical connector 302e which is for mating with the base connector of the enclosure 118. In some embodiments, air is exhausted toward the user's body by air nozzles 309 of the punching bag. These air outlet nozzles receive air form the compressor 212 via an air inlet connector 311.

In an embodiment, biometric sensors are used to indicate a user's performance or condition. As show in FIG. 3A, one such sensor is a biometric wrist band sensor 317a that is used to indicate a user's heart rate. A biometric sensor cable 315a interconnects the wrist band sensor and the controller 106 when a biometric sensor cable connector 319a is mated with an exercise device biometric connector 313a-e that is interconnected with a respective exercise device connector 302a-e. Other biometric sensors including temperature, blood-pressure, and respiratory gas sensors may also be used.

In another embodiment, each exercise device 104a-e includes an exercise device attribute module 109a-e that is interconnected with the controller via a respective exercise device electrical connector 302. The attribute module utilizes non-volatile memory to store information that automatically identifies a particular exercise device to the controller 106 when the exercise device is installed in the enclosure 102. In some embodiments, the attribute module utilizes non-volatile memory to store game(s) and/or game(s) data.

FIGS. 4a-b show respective machine gun 122a and aircraft control panel 122b theme elements. Each of these theme elements is removably attachable to one or more exercise devices 104a-e, for example the stationary bike and tread mill 104a-b. As shown in FIGS. 1, 3A, and 3B, the stationary bike and tread mill have upstanding yolks or third mechanical mounting fixtures 310a-b that receive removably attachable handlebars 308a-b. A theme element is removably attachable to the exercise device by inserting its mounting post or fourth mechanical mounting fixtures 406a-b into the yolk. In some embodiments the theme element replaces the handlebars and in other embodiments, the theme element is used in conjunction with the handlebars.

Theme element electrical transducers within the machine gun theme element 408a indicate, inter alia, when the trigger is actuated and where the machine gun is pointed. Typical transducers for indicating trigger actuation include electrical switches and potentiometers. Typical transducers for aiming include optical devices including charged coupled devices and light emitting diodes.

Theme element electrical transducers within the aircraft control panel theme element 408b indicate to the controller 106, inter alia, when one or more aircraft weapons have been fired and where it is pointed. In addition, the status of or change to aircraft course, speed, altitude, and attitude is indicated to the controller. Typical transducers used to indicate weapons fire, weapons aiming, and aircraft status include those mentioned above. Typical transducers used to indicate aircraft maneuvering also include rotary potentiometers and digital potentiometers for variables such as aileron control actions.

Transducers within the theme elements 408a-b are electrically interconnected with a respective exercise device 102a-b via an electrical cable 402a-b extending between the theme element and a theme element electrical connector 404a-b. A mating theme element yolk connector on the exercise device 312a-b is for mating with the theme element connector. The theme element yolk connectors 312a-b are interconnected with the controller 106 via the respective exercise device connectors 302a-b. As will be clear to a person of ordinary skill in the art, these and other signal communications of the cyber sports exercise system 100 may be exchanged between the theme elements, the exercise device, the control panel, and the controller using other means. For example, the electrical cables may be replaced by integrating the theme element yolk connector 312 and theme element connectors into their respective mechanical mounts 310, 406. In addition, wireless methods including optical signals such as infrared and radio frequency communications such as 802b and 802g may be used.

The control panel 112 provides a man-machine interface for the user. In some embodiments it includes a video screen 112a and keyboard or pad 112b and in some embodiments it includes a digital connection such as a USB port 112c and/or a device such as a compact disc drive 112d for exchanging data. The data exchanged includes one or more of game software, game data, user data, and exercise regime/protocol or device data. In other embodiments, the control panel may be replaced by a laptop computer or another personal computer having an interface such as a computer, front panel, a computer keyboard, a mouse, and/or a computer monitor.

In an embodiment, each theme element 122a-b includes a theme element attribute module 410a-b. The attribute module stores information in non-volatile memory that automatically identifies a particular theme element to the controller 106 when the theme element is installed on an exercise device 104a-b that is installed in the enclosure 102. In some embodiments, the attribute module uses non-volatile memory to store games and/or game data.

Figure 5:
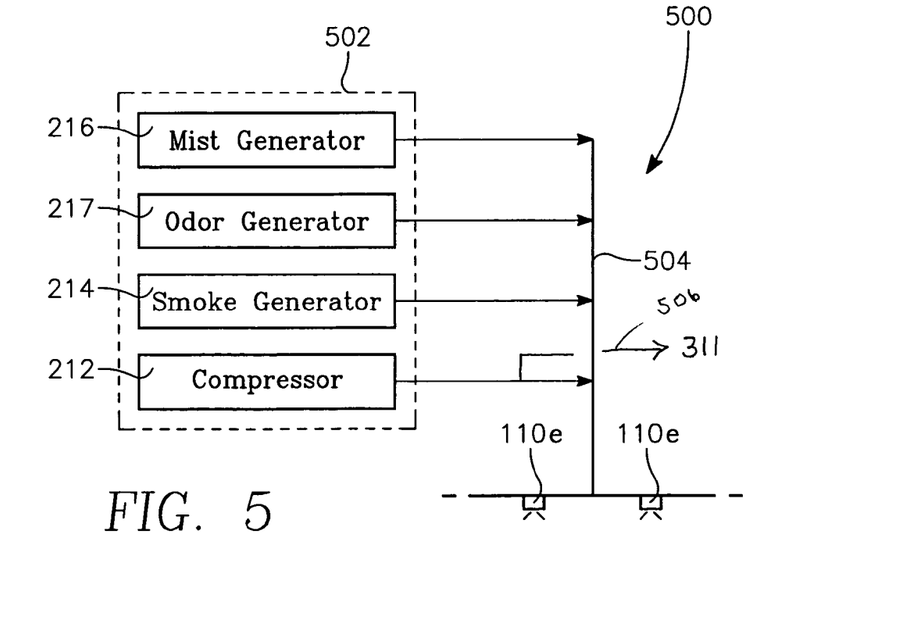
FIG. 5 is a schematic of a sensory stimulator fluid distribution system of the cyber sports exercise system of FIG. 1.

FIG. 5 shows a fluid distribution system 500 of the cyber sports exercise system 100. The fluid distribution system includes sensory stimulator fluid generators 502 interconnected with distribution heads 110e via a distribution network 504. In particular, a mist generator 216, an odor generator 217, a smoke generator 214, and a compressor 212 each discharge to distribution manifold 504. One or more distribution heads 110e deliver the stimulant fluid to the enclosure 102. In an embodiment, the air compressor supplies air to a punching bag air inlet 311 via a conduit 506.

Figure 6:
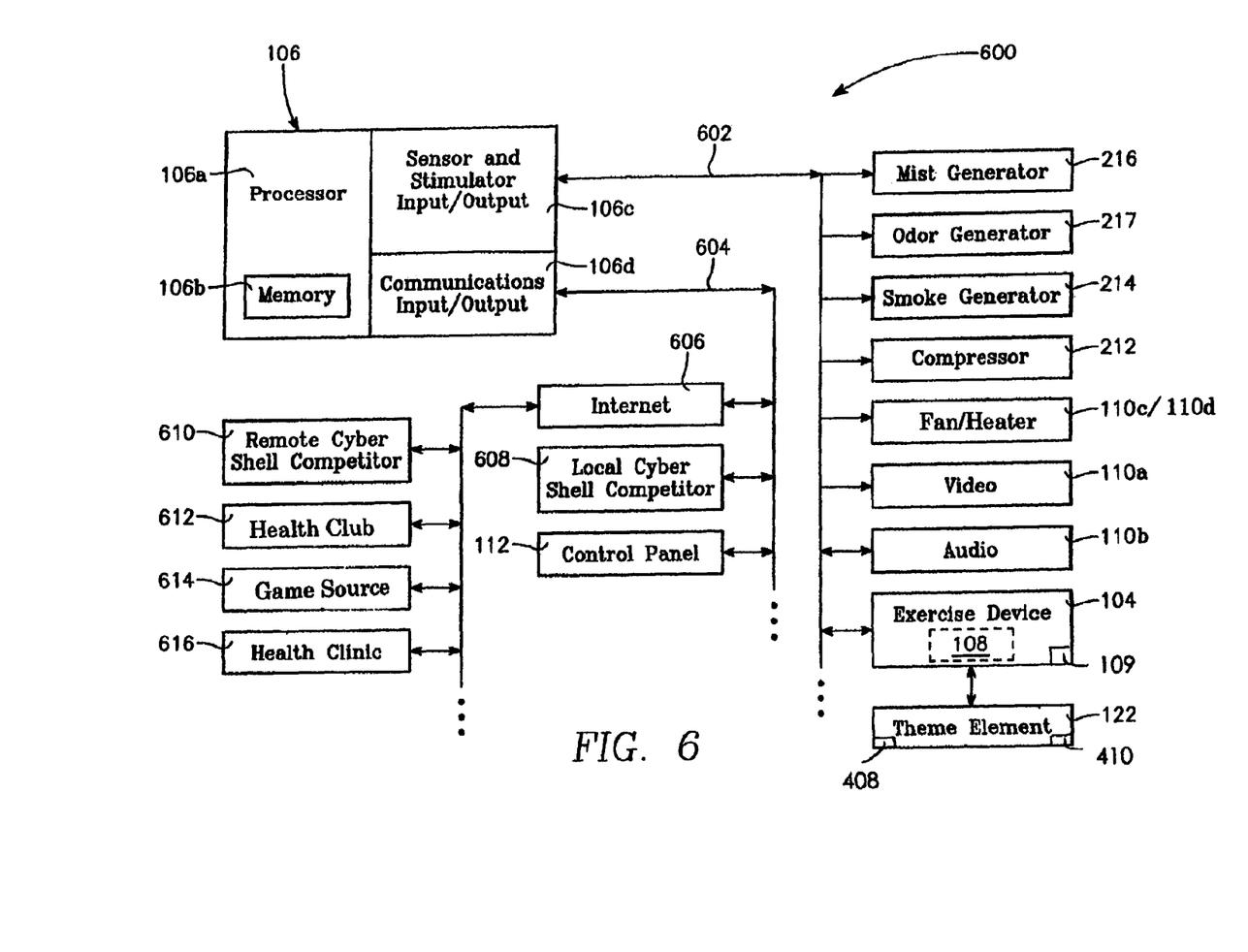
FIG. 6 is schematic of a controller and its interconnections of the cyber sports exercise system of FIG. 1.

FIG. 6 shows a control and interface system 600 of the cyber sports exercise system 100. It includes the controller 106, a first input/output bus 602, and a second input/output bus 604. In some embodiments, a single input/output bus may replace the first and second input/output busses.

The controller 106 includes a processor unit 106a, volatile and/or non-volatile processor memory 106b, and two input/output sections 106c-d. Input/output section 106c provides an interface for sensory stimulators 110, exercise devices 104 and related sensors 108, and theme elements 122 and related transducers 408 via first input/output bus 602. Input/output section 106d provides a general communications interface via second input/output bus 604.

The controller 106 utilizes controller instructions and data that embody an interactive game for motivating a user. In particular, the processor unit 106a utilizes game software and/or data stored in one or more of the processor memory 106b, the exercise device attribute modules 109, and the theme element attribute modules 410 in combination with one or both of user and wide area network 606 instructions to create and to manipulate game play. The user experiences the resulting game play environment as it is manifested by the sensory stimulators 110a-e which are also under the control of the processor. While a single processor has been described, persons of ordinary skill in the art will recognize that a plurality of interconnected processors including special purpose processors and general purpose processors may also be used.

Interconnections with the first input/output bus 602 include devices which receive signals from the controller 106. In an embodiment, these devices include the mist, odor, and smoke generators 216, 217, 214, the compressor 212, the fan 110c, the heater 110d, and the video display 110a. In addition, interconnected devices that exchange bidirectional signals are interconnected with this bus. In an embodiment, these devices include speakers 110b, exercise device sensors 108, exercise device attribute modules 109, theme element transducers 408, and theme element attribute modules 410.

Interconnections with the second input/output bus 604 include local connections and remote connections made via a wide area connection such as an internet connection 606. Typically, each of these interconnections utilizes bi-directional signal exchange. The local connections include a wide area or internet connection 606, a connection to a second cyber sports exercise system, for example a competitor, 608, and a connection with the control panel 112. The remote connections made via the wide area network include remote cyber sports competitor(s) 610, a health club 612, a source for new games, game data, or software 614, and a health clinic 616.

As will be recognized by persons of ordinary skill in the art, the wide area interconnection 606 may utilize connections other than hardwired connections. As an example, an 802b, 802g, or cellular type wireless networking devices may be used to provide the controller 106 with a wide area connection available from a wireless router, cellular tower, or similar device.

In operation, the cyber sports exercise system offers its users not only exercise, but also an experience. Experiences offered are in the form of virtual reality games that place the user in an environment appropriate for the game being played. Each game is associated with one or more possible setups that determine which exercise device and theme element, if any, will be needed to play the game. Utilization of the cyber sports exercise system includes acquisition of games, game selection, setup, game play, score and compare, and save and transmit.

Games and game data may be loaded into the cyber sports exercise system in any of the ways that a game is commonly loaded into a personal computer. In an embodiment a compact disc or USB memory stick device is used to upload games via the USB port of the control panel 112c. In another embodiment, the wide area interconnection 606 acquires games and or game data from a remote game source 614; such game acquisition may occur when the controller 106 makes a request or in response to a user instruction entered at the control panel. Still other embodiments may utilize game and/or game data stored in the attribute modules 109, 410 associated with the exercise devices and/or theme elements. In some embodiments, the first connection of a new attribute module will cause the controller to automatically request games associated with the related exercise device 104a-e or theme element 122a-b from the remote game source 614.

Selection of the game to be played may be made by the user via the control panel 112, or it may be predetermined and saved on the controller 106 based on time or on a prescribed exercise regime. In addition, the game may be automatically selected based on information received over the wide area connection 606 such as a competitor's request to play a particular game 610.

In an embodiment, a health care provider such as the health clinic 616 or the health club 612 prescribes an exercise regime for a user. Using the prescribed exercise regime, the game source 614 selects game(s) that realize the prescribed exercise regime. The selected game(s) are then transmitted to the controller 106 via the wide area network connection 606. Here, the matching of games to the prescribed exercise regime may be performed manually, or by use of a computer equipped with software to perform the matching operation.

In another embodiment, selection of a particular game causes the control panel to display 112a appropriate combinations of game appropriate exercise devices 104a-e and game appropriate theme elements 122a-b required to realize the selected game environment(s). In some embodiments having attribute modules, the controller displays a ready message to the user following the proper installation of an exercise device and theme element.

In some embodiments, a competitive game is played. Competitive games include those in which a) the adversary is constructed from data maintained on the controller 106 such as the present user's historical performance, b) the adversary is another local cyber sports exercise system player, or c) the adversary is a remote cyber sports exercise system player.

Particular embodiments provide a handicapping function. Here, historical exercise performance data for two competing users is maintained on the controllers of separate cyber sports exercise systems 106. Utilizing the wide area network connection 606, the historical data is operated on by a single controller to produce a handicap value that is applied to the indicated exercise performance of at least one of the users.

In an exemplary game, a first cyber sports exercise system player requests competitive play with a second cyber sports exercise system player who may be local or remote. The game selected is an aerial dogfight. Each controller 106 displays 112a, 110a an equipment needed list including either of the stationery bike 104a or the tread mill 104b, and the aircraft control panel 122b. The controller displays a ready message to the players when the cyber sports exercise systems are ready for play.

Game play begins when each player is able to view a depiction of the other on the video screen 110a. The perspective of each player is presented on respective video screens and it is that as seen from an aircraft cockpit looking into the distance at another aircraft. During game play each player is actuating a tread mill or stationery bike; he is also using his weapons in an attempt to destroy his opponent and his flight controls to maneuver the aircraft so as to evade enemy fire. Both the weapons and flight controls are implemented in the aircraft control panel theme element 122b.

In an embodiment, the player's performance on the exercise device is used to modify the game play. As an example, a player's quantity of weapons, ammunition, or fuel may be increased or decreased to reflect his exercise performance. In another example the accuracy of a player's weapon fire may be adjusted to reflect his exercise performance. An exercise performance standard is selected from any variable able to be inferred from the exercise device sensors 108 and the biometric sensors 317 such as reaching a certain level of exertion reflected by heart rate, or reaching a certain level of energy expended such as a quantity of calories consumed.

During the dogfight game, the sensory stimulators are used to simulate the environment applicable to the game. As examples, noise 110b may indicate weapon fire, smoke 214 a direct hit following weapons fire, odor 217 and heat 110d the presence of an aircraft fire following a direct hit. In some embodiments, each player's score is displayed on the video screen 110a and in some embodiments the players are able to communicate with each other using for example the wide area network 606 and voice over IP with the installed speakers 110b.

The stepping machine 104c, kayak 104d, and punching bag 104e are utilized with games that incorporate these exercise devices into other experiences. In an embodiment, the stepping machine is incorporated into a mountain climbing experience where the video display 110a reacts to the user's steps by presenting the perspective of a mountain climber taking similar steps. In some embodiments of the mountain climb experience the fan 110c, odor generator 217, and mist generator 216 provide the user with the simulated experience of climbing in a tropical region.

Similarly, in an embodiment the kayak 104d is used with an appropriate experience such as avoiding a river waterfall. Here, the video display 110a depicts a kayaker in a boat struggling against a fast moving river as she pulls the boat's oars to avoid being swept over the falls. In some embodiments the audio speakers 110b provide the sound of the water and of the oars and the video display depicts the progress made by an oarsman making similar strokes.

The punching bag 104e may also be used in various experiences or games created by the cyber sports exercise system. In an embodiment, a user may be confronted with an opponent in a prize fight. Here the video display 110a depicts a boxing ring and the fighters with one of the fighters striking blows similar to those struck on the punching bag by the user.

When a game ends, the final score is presented to the user(s) via the video display 110a and if a competitive game has been played, the scores are compared to determine the winner. In some embodiments, game data is stored for use in future competitive games and to provide analysis of user activity including game activity and exercise activity. As an example, the number of rounds fired and final score might be saved as representative of dogfight game activity. In addition, the duration and calories burned might be saved as representative of the related exercise activity.

In an embodiment, the game and or exercise data is shared over the wide area network with one or more remote cyber sports exercise system players, the health club, the health clinic, and the game supplier. Uses of the data include, inter alia, construction of a database representing the game play of a future competitor, determination of the user's compliance with a prescribed exercise regime, and to provide health care professionals with data for use in health assessments.

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An exercise system comprising:
   a partial enclosure, adapted to receive a user, having a base with one or more first mechanical mounting sockets;
   a controller having a set of controller instructions embodying an interactive game for motivating users of the exercise system;

a game appropriate exercise device selected from a plurality of different exercise devices, said exercise device having one or more first mechanical mounting fixtures and one or more second mechanical mounting sockets, at least one of said first mechanical mounting fixtures releasably engaging a respective first mechanical mounting socket during exercise; and a game appropriate theme element selected from a plurality of different theme elements, said theme element having one or more second mechanical mounting fixtures, at least one of said second mechanical mounting fixtures releasably engaging a respective second mechanical mounting socket during exercise wherein the plurality of said exercise devices consist of a bicycle, a treadmill, a stepping machine, a kayak and a punching bag, the plurality of theme elements consist of an aircraft control panel device and a rifle device, said exercise devices each include an exercise device attribute module, an exercise device sensor and a biometric sensor, each theme element includes a theme element attribute module, a theme element transducer, and the controller is in signal communication with the exercise device sensor, the biometric sensor, the theme element transducer and a man-machine interface for creating an environment within the partial enclosure that is responsive to a user's operation of the selected exercise device and the selected theme element.

2. The exercise system of claim 1 wherein when the controller is in signal communication with an attribute module of the exercise device, said exercise device attribute module informs the controller of the exercise device type that is currently mounted to the base, and the controller evaluates whether a game appropriate exercise device is engaged with the base for a particular game.

3. The exercise system of claim 2 wherein when the controller is in signal communication with an attribute module of the theme element, said them element attribute module informs the controller of the theme element type that is currently mounted to the exercise device, and the controller evaluates whether a game appropriate theme element is engaged with the exercise device for a particular game.

4. The exercise system of claim 3 whereby the controller utilizes signals from an exercise device sensor in physical contact with the exercise device and a biometric sensor in physical contact with the user to derive an indication of the user's exercise performance wherein said indication affects at least one variable of a game.

5. The exercise system of claim 4 wherein the efficacy of a user operable theme element control changes with the affected variable.

6. The exercise system of claim 5 wherein the theme element includes a plurality of user operable controls for participating in the game, said controls being operably coupled to respective transducers for affecting a plurality of game variables.

7. An exercise system comprising:
a partially enclosed space, adapted to receive a user, defined by a base having one or more first mechanical mounting sockets, a forward wall, a partial rear wall, and a partial ceiling;
a controller having a set of controller instructions embodying an interactive game for motivating users of the exercise system;
a game appropriate exercise device selected from a plurality of exercise devices, said exercise device having one or more first mechanical mounting fixtures and one or more second mechanical mounting sockets, at least one of said first mechanical mounting fixtures releasably engaging a respective first mechanical mounting socket during exercise; and a game appropriate theme element selected from a plurality of theme elements, said theme element having one or more second mechanical mounting fixtures, at least one of said second mechanical mounting fixtures releasably engaging a respective second mechanical mounting socket during exercise wherein the plurality of said exercise devices consist of a bicycle, a treadmill, a stepping machine, a kayak and a punching bag, the plurality of theme elements consist of an aircraft control panel device and a rifle device, said exercise devices each include an exercise device attribute module, an exercise device sensor and a biometric sensor, each theme element includes a theme element attribute module, a theme element transducer, and the controller is in signal communication with the exercise device sensor, the biometric sensor, the theme element transducer and a man-machine interface for creating an environment within the partial enclosure that is responsive to a user's operation of the selected exercise device and the selected theme element.

8. The exercise system of claim 7 whereby the controller utilizes signals from a sensor in physical contact with the exercise device and a sensor in physical contact with the user to derive an indication of the user's exercise performance said indication affecting at least one variable of the game.

9. The exercise system of claim 8 wherein the efficacy of a user operable theme element control changes with the affected variable.

10. The exercise system of claim 9 wherein the theme element includes a plurality of user operable controls for participating in the game, said controls being operably coupled to respective transducers for affecting a plurality of game variables.

11. The exercise system of claim 10 further comprising another identical exercise system wherein the respective controllers are in signal communication for enabling competitive game play between a first user of the first of the exercise systems and a second user of the second of the exercise systems.

12. The exercise systems of claim 11 wherein a user's indicated exercise performance is handicapped based on a comparison within a controller of both users historical exercise performance data, said data for the first user being stored in the controller of the first exercise system and said data for the second user being stored in the controller of the second exercise system.

13. The exercise systems of claim 12 wherein signal communications between the first and second controllers occur over a wide area network.

14. The exercise system of claim 7 wherein the controller is in signal communication with an attribute module of the exercise device, said exercise device attribute module informing the controller of the exercise device type and the controller evaluating for the particular game whether a game appropriate exercise device is engaged with the base.

15. The exercise system of claim 14 wherein the controller is in signal communication with an attribute module of the theme element, the theme element attribute module informing the controller of the theme element type and the controller evaluating for the particular game and the particular exercise device whether a game appropriate theme element is engaged with the exercise device.

16. The exercise system of claim 15 further comprising sensory stimulators that include sensory fluid outlet heads interconnected via a sensory fluid distribution system with a mist generator, an odor generator, a smoke generator, and an air compressor.

17. The exercise system of claim 16 wherein the sensory stimulators further include a fan, a heater, a video display, and a speaker.

18. The exercise system of claim 17 wherein the controller is in signal communication with a health care provider and a game source via a wide area network.

19. The exercise system of claim 18 wherein the health care provider prescribes a particular exercise regimen for the user and the game source utilizes said prescribed exercise regimen to select one or more games to be transmitted to the controller via the wide area network.

20. An exercise system comprising:
- a partially enclosed space, adapted to receive a user, defined by a base having one or more first mechanical mounting sockets, a forward wall, a partial rear wall, and a partial ceiling;
- a controller having a set of controller instructions embodying an interactive game for motivating users of the exercise system;
- a game appropriate exercise device selected from a plurality of exercise devices, said exercise device having one or more first mechanical mounting fixtures and one or more second mechanical mounting sockets, at least one of said first mechanical mounting fixtures releasably engaging a respective first mechanical mounting socket during exercise; and
- a game appropriate theme element selected from a plurality of theme elements, said theme element having one or more second mechanical mounting fixtures, at least one of said second mechanical mounting fixtures releasably engaging a respective second mechanical mounting socket during exercise wherein the plurality of said exercise devices consist of a bicycle, a treadmill, a stepping machine, a kayak and a punching bag, the plurality of theme elements consist of an aircraft control panel device and a rifle device, said exercise devices each include an exercise device attribute module to inform the controller of the exercise device type, an exercise device sensor and a biometric sensor, each theme element includes a theme element attribute module to inform the controller of the theme element type and a theme element transducer wherein the controller is in signal communication with the exercise device attribute module, the theme element attribute modules, the exercise device sensor, the biometric sensor, the theme element transducer and a man-machine interface for creating an environment within the partial enclosure that is responsive to a user's operation of the selected exercise device and the selected theme element.

* * * * *